United States Patent [19]
Kamitani et al.

[11] Patent Number: 4,666,286
[45] Date of Patent: May 19, 1987

[54] APPARATUS FOR SCANNING AN ORIGINAL

[75] Inventors: Yutaka Kamitani; Yuji Nakanishi, both of Hyogo, Japan

[73] Assignee: Sanyo Electric Co., Ltd., Japan

[21] Appl. No.: 753,178

[22] Filed: Jul. 9, 1985

[30] Foreign Application Priority Data

Aug. 6, 1984 [JP] Japan .................................. 59-165378

[51] Int. Cl.$^4$ ............................................. G03G 15/00
[52] U.S. Cl. ........................................ 355/8; 355/3 R; 355/14 R; 355/14 C
[58] Field of Search ..................... 355/7, 8, 3 R, 14 R

[56] References Cited

U.S. PATENT DOCUMENTS

| | | | |
|---|---|---|---|
| 4,270,857 | 6/1981 | Komori et al. | 355/8 |
| 4,340,295 | 7/1982 | Nakamura | 355/14 R |
| 4,350,439 | 9/1982 | Tanioka et al. | 355/7 X |
| 4,371,898 | 2/1983 | Nakamura | 355/7 X |

Primary Examiner—A. C. Prescott
Attorney, Agent, or Firm—Darby & Darby

[57] ABSTRACT

An apparatus for scanning an original comprises an original table for receiving an original, the table having protrusions on its underside corresponding to a home position (HP), a starting position (SP), and a forward going position (FP), respectively, whereby microswitches are located for sensing the protrusions as the original table moves back and forth, for producing digital signals indicative of the original table being at one of the aforesaid positions at a given time.

8 Claims, 8 Drawing Figures

APPARATUS FOR SCANNING AN ORIGINAL

BACKGROUND OF THE INVENTION

1. Field of the Invention

The present invention relates to an apparatus for scanning an original. More specifically, the present invention relates to an apparatus for exposing and scanning an original provided with a lamp holder or an original table, moving along a base body, for relatively moving an original and a lamp exposing the original.

2. Description of the Prior Arts

In an apparatus for scanning an original, for example, such as an electrophotographic copy machine, normally, a mechanism for detecting a relative position of the scanning means is provided. One example of a conventional original scanning apparatus is disclosed, for example, in Japanese Patent Application Laid Open No. 77243/1976 laid open on July 5, 1976 or in Japanese Utility Model Publication No. 39461/1983 published on Sept. 6, 1983.

In more detail, in the Japanese Patent Application Laid Open No. 77243/1976, for detecting four positions, a position of the original table of the electrophotographic copying machine, namely a home position, a forward going position at where the back-moving turns to the fore-moving, a starting position (a position for timing the arrangement of edges of the original and the copying paper) and a returning position at where the fore-moving turns to the back-moving, microswitches or Hall ICs corresponding to the respective positions have been used. On the other hand, in the Japanese Utility Model Publication No. 39491/1983, these positions may be estimated by counting pulse numbers of an encoder.

Thus, for detecting the position necessary for the scanning means, in the former, since a number of microswitches and the like are used, the number of components increase and result in a high cost as well as a low reliability. Also, in the latter where the encoder is used, a problem existed in that the accurate position can not be detected.

SUMMARY OF THE INVENTION

Therefore, a principal object of the present invention is to provide an apparatus for scanning an original having a small number of components and capable of detecting the position accurately.

Another object of the present invention is to provide an apparatus for scanning an original which is low in cost and reliable in use.

In brief, the present invention is an apparatus for scanning an original, comprising; moving means for relatively moving an original and a scanning means for scanning the original, a plurality of members to be detected arranged in a plurality of lines along a locus of relative movement of the original and the scanning means by the moving means, a plurality of sensors for detecting the members to be detected provided correspondingly respectively to the lines of members to be detected and means for detecting the relative position of the original and the scanning means responsive to the logical states of outputs from the plurality of sensors.

Members to be detected are preferably provided at least two in each of two lines. Logical states of two bits are produced by the combination of at least four members to be detected and two sensors. At least three different relative positions of the original and scanning means are detected from at least three kinds of logical states "00", "01" and "10" among them.

In the embodiment, a relative moving direction of the original and the scanning means is detected and by combining the direction information and the logic signals from the sensors, for example, the home position, the forward going position, the starting position and the returning position may be detected respectively by "01", "00", "01" and "10".

According to the present invention, since at least three relative positions of the original and the scanning means can be detected by using only two sensors, a number of sensors are not required thus resulting in reducing the number of components. Also, the different positions can be detected accurately responsive to the different logical states. Since the encoder is not used, a reliable detecting of the position is possible.

These objects and other objects, features, aspects and advantages of the present invention will become more apparent from the following detailed description of the embodiment of the present invention when taken in conjunction with accompanying drawings.

DESCRIPTION OF THE PREFERRED EMBODIMENTS

Figure 1:
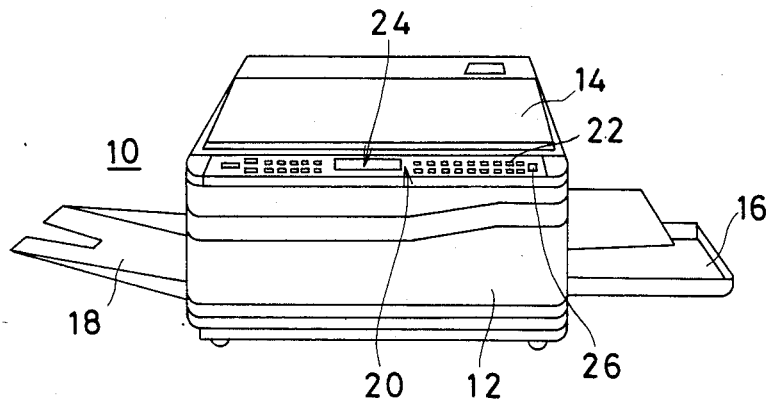
FIG. 1 is a general external view showing one embodiment of the present invention.

FIG. 1 is a general external view showing one embodiment of the present invention. In the following description, the embodiment wherein the present invention is applied in an electrophotographic copying machine will be described. However, it will be indicated in advance that the present invention is also applicable in all other equipments of the type which scans an original with a light source and other scanning means, for example, a facsimile.

An electrophotographic copying machine 10 includes a body 12, whereon an original table 14 is disposed and supported movably in the left and right directions. On one end side of the body 12, a paper feeding portion having a paper feed cassette 16 being mounted attachably/detachably thereon is formed, while on the other end side of the body 12, a paper discharging portion including a discharging tray 18 is formed. Accordingly, the copying papers fed from the paper feed cassette 16 are discharged on the discharging tray 18 after the original placed on the original table 14 being recorded thereon.

On the upper surface of the body 12, an operation panel 20 is formed, whereon a key board 22 and a display panel 24 are arranged. The key board 22 is provided with a start key 26 and, for example, a ten key for setting the number of sheets to be copied.

Figure 2:
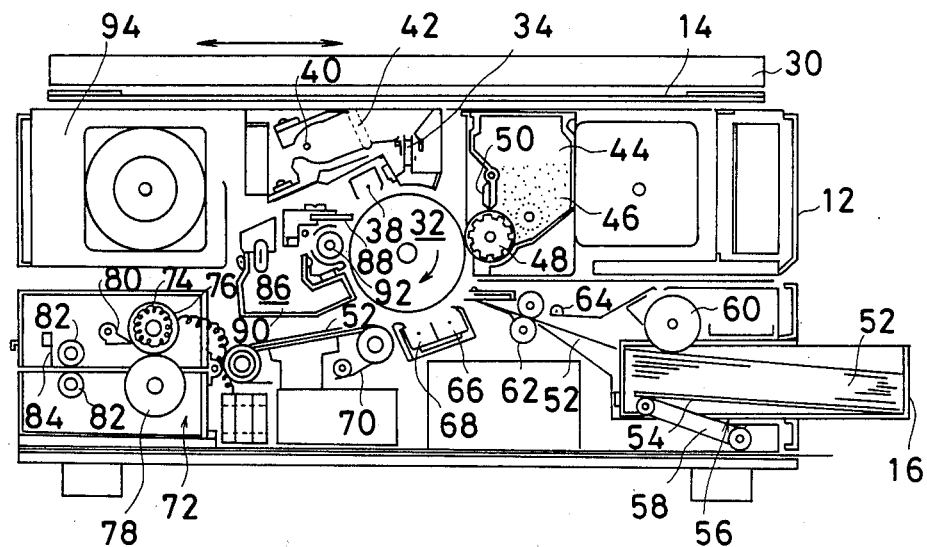
FIG. 2 is an illustrative view showing an internal structure of the embodiment.

Now, an internal structure of the embodiment in FIG. 1 will be described in detail referring to FIG. 2. On the upper surface of the copying machine body 12, the original table 14 is arranged movably on both sides as mentioned above. The original table 14 consists of, for example, a transparent glass plate, whereon an original cover 30 is mounted so as to be able to be opened or closed. In a generally center portion within the body 12, a photosensitive drum 32 coated with a photoconductive layer, for example, such as amorphous silicon, namely, a photosensitive material on the periphery thereof is arranged rotatably in a direction shown by the arrow (clockwise). Above the top of the photosensitive drum 32, a short focal distance lens array 34 is mounted fixedly so that the optical axis thereof will direct generally to the vertical direction. The short focal distance lens array 34 focuses the original image formed by the original placed on the original table 14 on the peripheral surface of the photosensitive drum 32.

Also, at the upstream side of the short focal distance lens array 34 of the rotating direction of the photosensitive drum 32, a charging corotron 38 is provided fixedly to uniformly charge the photosensitive drum 32 in a prescribed polarity (for example, in positive polarity). Above the charging corotron 38, an exposure lamp 40 consisting of, for example, such as a halogen lamp for exposing the surface of the original placed on the original table 14 is disposed. In front of the exposure lamp 40, a filter 42 for absorbing, for example, infrared rays is arranged.

An electrostatic latent image of the original is formed on the photosensitive drum 32 by the charging corotron 38, the exposure lamp 40, the short focal distance lens array 34 and the original placed on the original table 14.

At the downstream side of the short focal distance lends array 34 in the vicinity of the periphery of the photosensitive drum 32, a developing apparatus 44 for developing the electrostatic latent image described above by a toner is disposed. In the developing apparatus 44, a developer 46 consisting of the toner and the carrier is accumulated, which is conveyed toward the photosensitive drum 32 by a magnet roller 48. At this time, a crest of developer 46 is formed at the portion where the magnet roller 48 faces with the photosensitive drum 32 and by the contact between a tip of the crest and the photosensitive drum 32, for example, the negatively charged toner adheres to the electrostatic latent image formed by the positive charge. Thus, the electrostatic latent image formed on the photosensitive drum 32 is formed as the toner image by the developing apparatus 44. Meanwhile, a blade 50 included in the developing apparatus 44 is used to control the crest height of the developer 46.

In the paper feed cassette 16 mounted attachably/detachably on one end side of the body 12, copying papers 52 are stacked. Then, on the bottom of the paper feed cassette 16, a supporting plate 54 whereon the copying papers 52 being placed, is disposed in a freely swingable fashion in a vertical direction. Beneath the supporting plate 54, an opening 56 is formed and a free end of a push-up lever 58 of which base end is mounted swingably on the inner bottom portion of the body 12, is extending therethrough. Associated with the push-up lever 58, a spring (not shown) is provided for forcibly rotating the lever 58 in the clockwise direction and the supporting plate 54 may be pushed upwardly by the spring. Accordingly, the copying papers 52 stacked in the paper feed cassette 16 are pushed upwardly by the push-up lever 58 and the uppermost thereof will contact a feed roller 60 and will be taken in.

On the rear side of the feed roller 60, a register roller 62 is arranged, thereby the copying papers fed from the paper feed cassette 16 are stopped temporarily and thereafter sent toward the photosensitive drum 32 in synchronization with the movement of the original table 14. Meanwhile, a photosensor 64 provided in the vicinity of the register roller 62 is used to detect whether or not the copying papers 52 exist in that portion.

In a space wherein the copying papers 52 are supplied from the register roller 62 and adjacent to the side of the photosensitive drum 32, a transferring corotron 66 for transferring the toner image developed by the developing apparatus 44 on the copying papers 52 is disposed. A separating corotron 68 is provided integrally with the transferring corotron 66, thereby an A.C. corona discharge is charged to the transferred copying papers and the electric charge thereof is neutralized to prevent the copying paper having the toner image formed on the photosensitive drum 32 being transferred thereupon, from being adhered by the residual charge of the photosensitive drum 32.

At the downstream side of the separating corotron 68, a vacuum conveyor 70 for conveying the copying paper 52 being transferred with the toner image thereon is provided. The copying paper 52 is conveyed toward a fixing apparatus 72 by the vacuum conveyor 70.

The fixing apparatus 72 is constituted by a press roller 78 contacting with a heat roller 76 containing a heater 74. Then, the fixing takes place when the copying paper 52 being transferred with the toner image is heated and pressed by passing through the two rollers 76 and 78. A claw 80 disposed associated with the heat roller 76, is used to prevent the offset of the fixed copying paper 52 on the heat roller 76. Then, at the downstream side of the heat roller 76, a delivery roller 82 is provided for delivery the fixed copying paper 52 on the delivery tray 18 (FIG. 1). At the downstream side of the delivery roller 82, a sensing clutch 84 is arranged for sensing the existence of the copying paper 52 thereat.

Above the vacuum conveyor 70 mentioned above in the vicinity of the periphery of the photosensitive drum 32, a cleaning apparatus 86 is provided, thereby the toner remained on the photosensitive drum 32 without being completely transferred is removed. The cleaning apparatus 86 includes a cleaning blade 88 for scraping the residual toner and a screw conveyor 92 for conveying the toner scraped by the cleaning blade 88 into a waste toner container 90.

For controlling such overall operation of the copying machine, a control box 94 is provided, wherein various components necessary for the control system to be described later are contained.

Now, the control or operation of the electrophotographic copying machine of the embodiment will be described in brief. The exposed scanning of the original is performed when the start key 26 is pressed after placing the original on the original table 14. That is, the original table 14 is moved and the original is slit exposed by the lamp 40. The light reflected from the original, namely, an original image is projected and focused on the photosensitive drum 32 by the short focal distance lens array 34 and thereby the electrostatic latent image corresponding to the original image is formed on the photosensitive drum 32. The electrostatic latent image thus formed is developed by the toner developing by the developing apparatus 44.

Such toner image is transferred onto the copying paper 52 supplied through the register roller 62 by the transferring corotron 66. The copying paper 52 being transferred with the toner image is separated from the photosensitive drum 32 by the separating corotron 68 and sent to the fixing apparatus 72 by the vacuum conveyor 70. Then, the toner image being transferred is fixed on the copying paper by the heat roller 76 and the press roller 78 and thereafter delivered onto the delivery tray 18 by the delivery roller 82.

Then, the excessive toner remained on the photosensitive drum 32 without being transferred on the copying paper 52 is removed by the cleaning apparatus 86 and the photosensitive drum 32 thus cleaned is charged again newly by the charging corotron 38.

Figure 3:
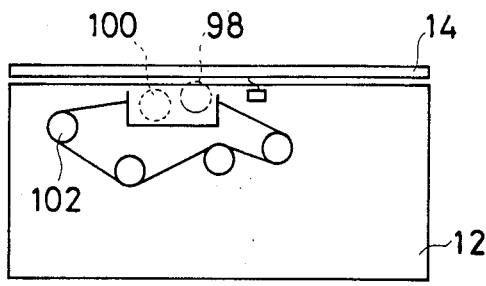
FIG. 3 is an illustrative view showing a major portion of the embodiment.
Figure 4:
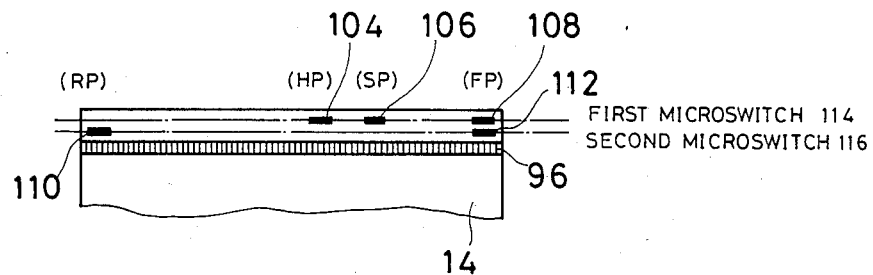
FIG. 4 is an illustrative view showing a back side of an original table of the embodiment.

FIG. 3 is an illustrative view showing a major portion associated with the original table of the embodiment, and FIG. 4 is an illustrative view showing a back side of the original table. In these figures, only major portions associated with the present invention are shown and other portions are as shown in previous FIG. 2.

On the upper surface of the copying machine body 12, the original table 14 is mounted slidably in both directions as previously described. On the back side of the original table 14, as clearly understood from FIGS. 3 and 4, a rack 96 extending along the moving direction thereof is secured and connected to a driving motor 102 via a pinion 98 and a clutch 100 contained in the copying machine body 12. The clutch 100 is actuated by a forward going solenoid 124 and a returning solenoid 126 (FIG. 6) to be described later and changes the moving directions of the original table 14.

On the back side of the original table 14 in the vicinity of the side edge thereof, five protrusions 104, 106, 108, 110 and 112 as the members to be detected as shown in FIG. 4, are formed protruding downwardly. In FIG. 4, the first protrusion 104 disposed in the first upper line corresponds to the home position (HP) of the original table 14 and the second protrusion 106 arranged in the same line corresponds to the starting position (SP) for supplying copy paper 52. Also, the third protrusion 108 provided in the first line together with the fifth protrusion 112 disposed in the second lower line, correspond to the forward going position (FP) at where the original table 14 turns from the back-moving to the fore-moving. In addition, the fourth protrusion 110 arranged in the second line corresponds to the returning position (RP) at where the original table 14 turns from the fore-moving to the back-moving.

Microswitches 114 and 116 are disposed, for example, on the body 12 corresponding to protrusions 104 through 112 in two lines so that the actuators thereof will be operated by these protrusions 104 through 112. The first microswitch 114 is arranged in the position at where the same contacts with the first protrusion 104 when the original table 14 is located in the home position (HP) and the second microswitch 116 is juxtaposed to the first microswitch 114.

Meanwhile, the third and fifth protrusions 108 and 112 are arranged substantially in the same position along the moving direction of the original table 14, that is, along the relative moving direction of the original and the scanning means (the exposure lamp 40 in the embodiment) and the first, second and fourth protrusions 104, 106 and 110 are disposed in positions spacing from each other respectively along the relative moving directions.

Figure 5:
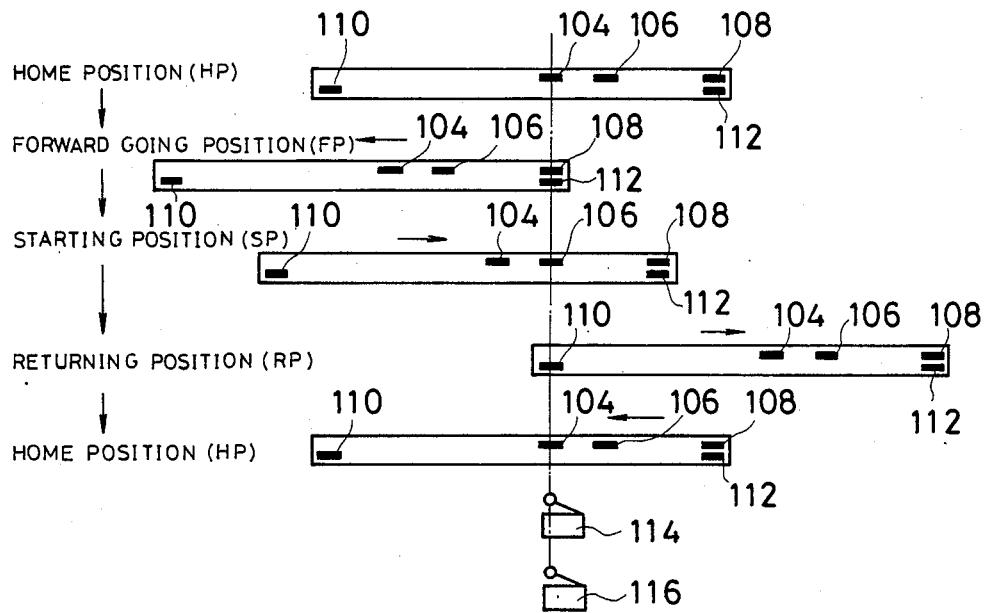
FIG. 5 is an illustrative view showing relations between an each position of original table and microswitches.

FIG. 5 is an illustrative view showing relations between the scanning position of the original table 14 and positions of microswitches 114 and 116. In the embodiment, an output "0" is to be produced when the microswitches 114 and 116 are in ON state and an output "1" is to be produced when in OFF state.

When the original table 14 is at the home position (HP), the first protrusion 104 contacts with the first microswitch 114 and the output "0" is produced only from the first microswitch 114. Then, if the original table 14 once moves back toward left and reaches the forward going position (FP), the third and fifth protrusions 108 and 112 contact respectively with the first and second microswitches 114 and 116 and the output "0" is produced respectively from both microswitches 114 and 116. Thereafter, the original table 14 turns the moving direction thereof, starts the fore-moving and reaches the starting position (SP). Then, the second protrusion 106 contacts with the first microswitch 114, wherefrom only, the output "0" is produced. When it is detected that the original table 14 has reached the starting position (SP), the feeding of the copying papers 52 standing by at the prescribed position, namely, at the register roller 62 (FIG. 2) is started and edges of the original and the copying paper 52 coincide timingly in the transferring.

Now, when the exposed scanning of the original is completed and the original table 14 reaches the returning position (RP), the fourth protrusion 110 contacts with the second microswitch 116, wherefrom only, the output "0" is produced. Then, the moving direction of the original table 14 is turned and the back-moving is started. Thereafter, when the original table 14 reaches the home position (HP), it is stopped.

Meanwhile, when a plurality of sheets are required to be copied continuously, the original table 14 that has moved back continues the moving dashingly to the forward going positin (FP) without stopping at the home position (HP).

The following table is obtained when expressed the relation between the positions of the original table 14 and the outputs from microswitches 114 and 116 in logical values. Meanwhile, although the logical values are equal for the home position (HP) and the starting position (SP), since the moving direction of the original table 14 is different as described later (a sequence of variations of the logic values is different), both positions, (HP) and (SP) can be distinguished correctly.

TABLE

| POSITIONS | 1st MICROSWITCH | 2nd MICROSWITCH |
|---|---|---|
| HP | 0 | 1 |
| FP | 0 | 0 |
| SP | 0 | 1 |
| RP | 1 | 0 |
| HP | 0 | 1 |

Figure 6:
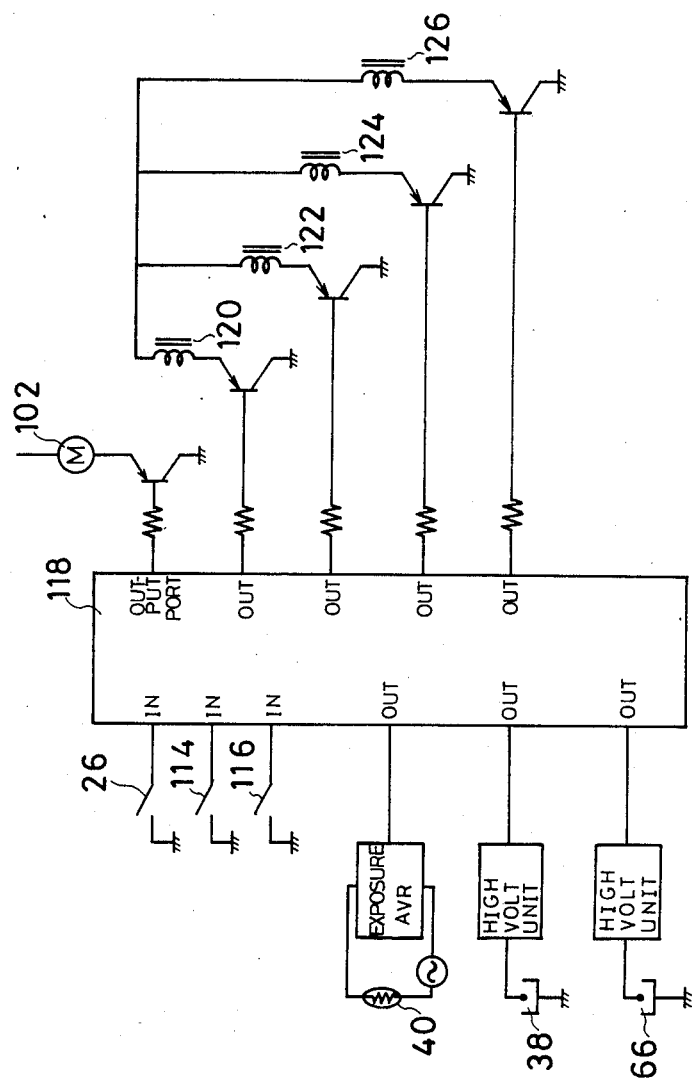
FIG. 6 is a circuit diagram showing one example of control circuit of the embodiment.

FIG. 6 is a block diagram showing one example of a control circuit of the embodiment described above. The control circuit includes one-chip microprocessor 118, to which input ports, the start key 26, the first microswitch 114 and the second microswitch 116 are connected via suitable input interfaces (not shown). Also to output ports of the microprocessor 118, the driving motor 102, the paper feed solenoid 120, the register roller solenoid 122, the forward going solenoid 124 and the returning solenoid 126 are connected via suitable output interfaces (not shown). Furthermore, to other output ports of the microprocessor 118, the exposure lamp 40, the charging corotron 38 and the transferring corotron 66 are connected similarly via output interfaces.

The paper feed solenoid 120 is for actuating the paper feed roller 60 (FIG. 2) and by the operation thereof the paper feed roller 60 is rotated and the feeding operation is started, thereby the copying papers 52 are conveyed to the register roller 52 and stopped. Then, the register roller solenoid 122 is for operating the register roller 62 (FIG. 2), and thereby the copying paper 52 being stopped once thereat is fed again toward the photosensitive drum 32. When the forward going solenoid 124 is operated, the original table 14 moves forward and when the returning solenoid 126 is operated, the clutch 100 (FIG. 3) is actuated and the original table 14 moves backward.

Figure 7:
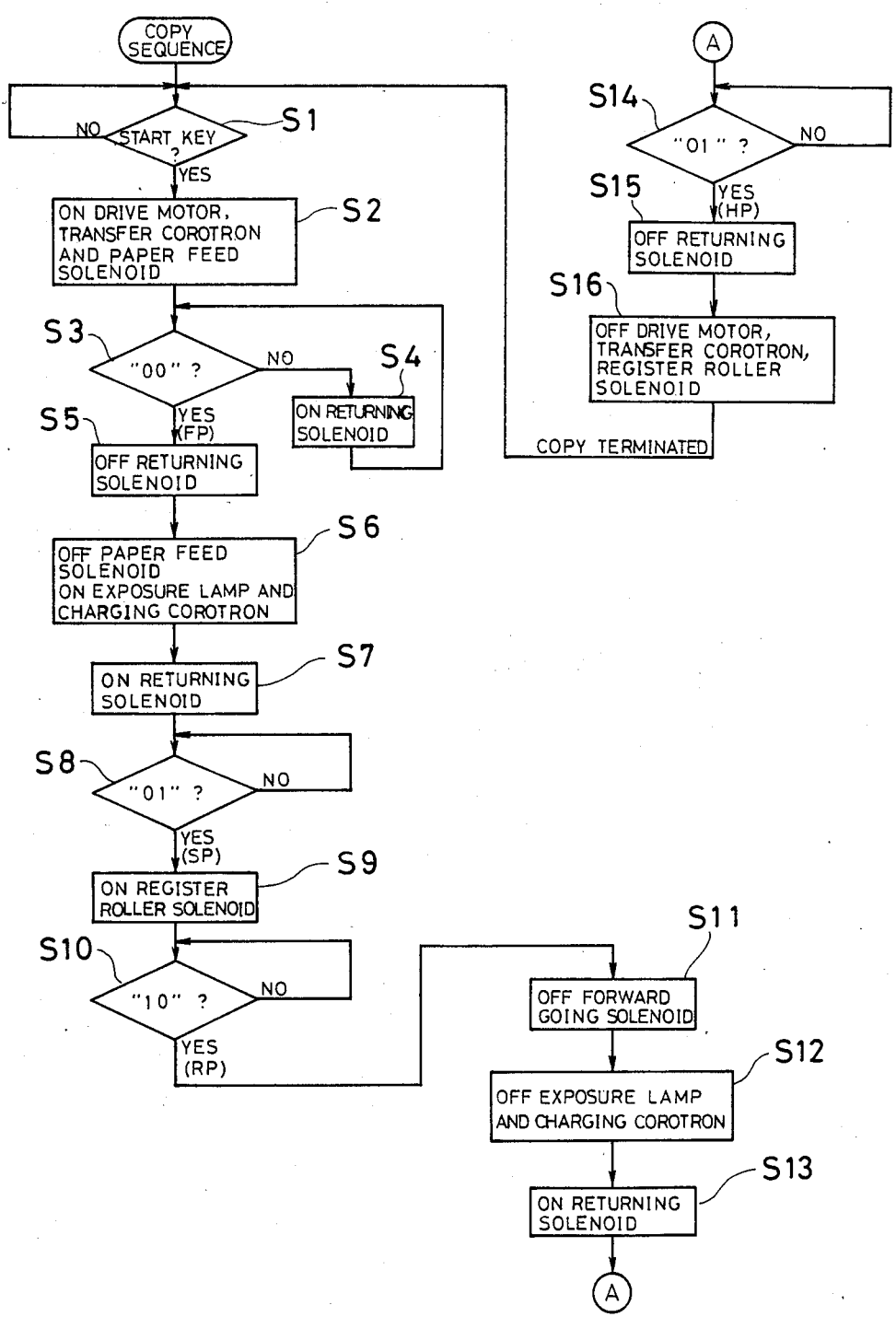
FIG. 7 is a flow chart for explaining an operation of the embodiment.

Now, the operation of the embodiment will be described referred to FIG. 7. In the first step S1 in FIG. 7, when it is detected that the start key 26 has been operated by an operator, the microprocessor 118 produces the output signal at the corresponding output port. Thereby, in the step S2, first the driving motor 102, the transferring corotron 66 and the paper feed solenoid 120, namely, the paper feed roller 60, are actuated and the feeding operation of the copying paper is started. Thereafter, the position of original table 14 tends to be detected by the logical states of outputs from first and second microswitches 114 and 116.

When the original table 14 is already in the forward going position (FP), that is, when the outputs of the two microswitches 114 and 116 are detected as "00" in the step S3, since the original table 14 is not needed to be moved back, the step S4 is not executed.

However, when it is not in the forward going position (FP), the microprocessor 118 will energize the returning solenoid 126 in the step S4 and moves the original table 14 to the forward going position (FP).

Thereafter, in the step S5, the returning solenoid 126 is turned off responsive to the signal from the microprocessor 118. Then, in the step S6, the microprocessor 118 produces the signal at the corresponding output port and actuates the exposure lamp 40 and the charging corotron 38. Accordingly, the original image is formed on the photosensitive drum 32 as the electrostatic latent image. At this time, the advance of copying papers is hindered by the register roller 62.

Next, in the step S7, the signal is produced from the microprocessor 118 and the forward going solenoid 124 is turned on. Thereafter, in order to catch the timing, whereby the electrostatic latent image of the original on the photosensitive drum 32 coincides with the edge of the copying paper 52, the microprocessor 118 waits for the original table 14 to reach to the starting position (SP) and the logical state of outputs of the microswitches 114 and 116 to become "01" in the step S8. Then, when the original table 14 has reached the starting position (SP), in the step S9, the microprocessor 118 gives the signal to the register roller solenoid 122. Accordingly, the register roller is opened and the copying papers 52 are fed again.

At this time, the transferring corotron 66 is operated and a toner image on the photosensitive drum 32 is transferred onto the copying papers 52 in sequence. Also during the transfer, the original table 14 continues to move.

When the original table 14 reaches the returning position (RP), in the step S10, it is detected that the logical state of the outputs of the microswitches 114 and 116 have become "01". Accordingly, the microprocessor 118 turns off the forward going solenoid 124 in the step S11. Also then, the exposure lamp 40 and the charging corotron 38 are deenergized in the step S12. Then, thereafter, the returning solenoid 126 is actuated in the step S13 and the original table 14 moves back.

Thereafter, when the original table 14 reaches the home position (HP), in the step S14, the logical state "01" of the outputs of the microswitches 114 and 116 is detected. Accordingly, in the step S15, the microprocessor 118 turns off the returning solenoid 126 and, in the step S16, turns off the driving motor 102, the transferring corotron 66 and the register roller solenoid 122, thus all operations are stopped.

Figure 8:
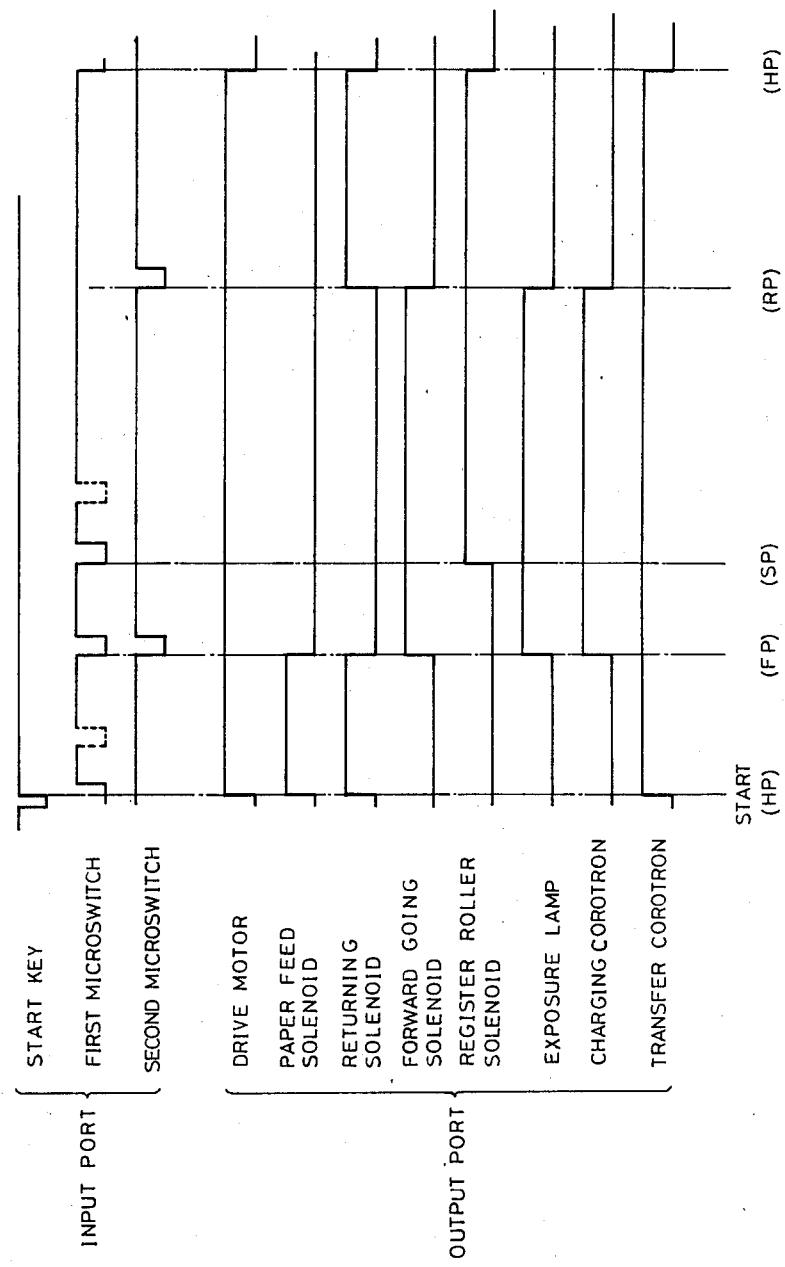
FIG. 8 is a time chart for explaining an operation of the embodiment.

Meanwhile, the first microswitch 114 produces the signal between the home position (HP) and the forward going position (FP) and between the starting position (SP) and the returning position (RP) (refer to the dotted line portion in FIG. 8), thereat the logical states of the outputs of the microswitches 114 and 116 both become "01" and are equal. However, since it is in the state to wait for the logical state "00" from the home position (HP) to the forward going position (FP) and for the logical state "10" from the starting position (SP) to the returning position (RP), even if the logical state "01" is given thereat, this logical state is neglected and a normal sequence will be performed.

Meanwhile, in the embodiment described above, although a microswitch is used as a sensor of the member to be detected, it is not limited thereto but also a magnetic sensor or a photosensor may be used.

Furthermore, in the above description, the embodiment wherein the original table 14 is moved while the exposure lamp 40 is fixed, has been described. However, it will be understood that the present invention is readily applied in the electrophotographic copying machine of the type having the exposure lamp 40 which moves conversely.

Moreover, the fore and back movings of the original table 14 and the exposure lamp 40 may be changed over not by the clutch 100 but directly by switching over the rotating direction of the motor 102.

Also, for coinciding the timing of the electrostatic latent image of the original with the copying paper, such as a shutter which has a same function, may be used in place of the register roller 62 described above.

Although the present invention has been described and illustrated in detail, it is clearly understood that the same is by way of illustration and example only and is not to be taken by way of limitation, the spirit and scope of the present invention being limited only by the terms of the appendid claims.

We claim:
1. An apparatus for scanning an original comprising;
scanning means for scanning an original,
moving means for relatively moving said original and said scanning means,
a plurality of members to be detected arranged in a plurality of lines along a locus of the relative movement of an original and an scanning means by said moving means,
a plurality of sensors for detecting said members to be detected disposed corresponding respectively to lines of said members to be detected, and means for detecting different relative positions of said original and said scanning means responsive to the combination of logical states of outputs from said plurality of sensors.

2. An apparatus for scanning an original in accordance with claim 1, wherein said members to be detected are arranged in two lines, whereby said detecting means can detect at least three different relative positions of said original and said scanning means.

3. An apparatus for scanning an original in accordance with claim 2, wherein said members to be detected are disposed at least two in each line, one member to be detected in one line and one member to be detected in another line are disposed substantially in the same position in said relative moving direction and remaining members to be detected are disposed spacing from each other in said relative moving direction, accordingly outputs of said two sensors are at least in three logical states.

4. An apparatus for scanning an original in accordance with claim 3, wherein one of said two lines, a further member to be detected is disposed in a position different from another member to be detected in said relative moving direction.

5. An apparatus for scanning an original in accordance with claim 4, wherein means for detecting said position detects four different positions based upon the relative moving direction of said original and said scanning means and logical states of outputs of said two sensors.

6. An apparatus for scanning an original in accordance with claim 5, wherein said four different positions include a home position (HP), a forward going position (FP), a starting position (SP) and a returning position (RP).

7. An apparatus for scanning an original comprising:
scanning means for scanning an original,
moving means for relatively moving said original and said scanning means,
a plurality of members to be detected arranged in two lines along a locus of the relative movement of said original and said scanning means by said moving means,
two sensors for detecting said members to be detected disposed corresponding respectively to lines of said members to be detected, said two sensors being arranged at the substantially same position in a direction of said relative movement, and
means for detecting different relative positions of said original and said scanning means responsive to the combination of logical states of outputs from said two sensors.

8. An apparatus for scanning an original comprising:
scanning means for scanning an original,
moving means for relatively moving said original and said scanning means,
a plurality of members to be detected arranged in a plurality of lines along a locus of the relative movement of said original and said scanning means by said moving means,
a plurality of sensors for detecting said members to be detected disposed corresponding respectively to lines of said members to be detected,
means for detecting logical states of outputs from said plurality of sensors, and
controlling means for controlling said moving means in accordance with the combination of said logical states detected by said means for detecting logical states.

* * * * *